June 23, 1970 C. E. BEHRENS 3,516,174
CONTROL ARRANGEMENT FOR DRY CLEANING MACHINES Filed Feb. 26, 1968 7 Sheets-Sheet 1

Inventor
Curtis E. Behrens
By
H. J. Schmid
Att'y

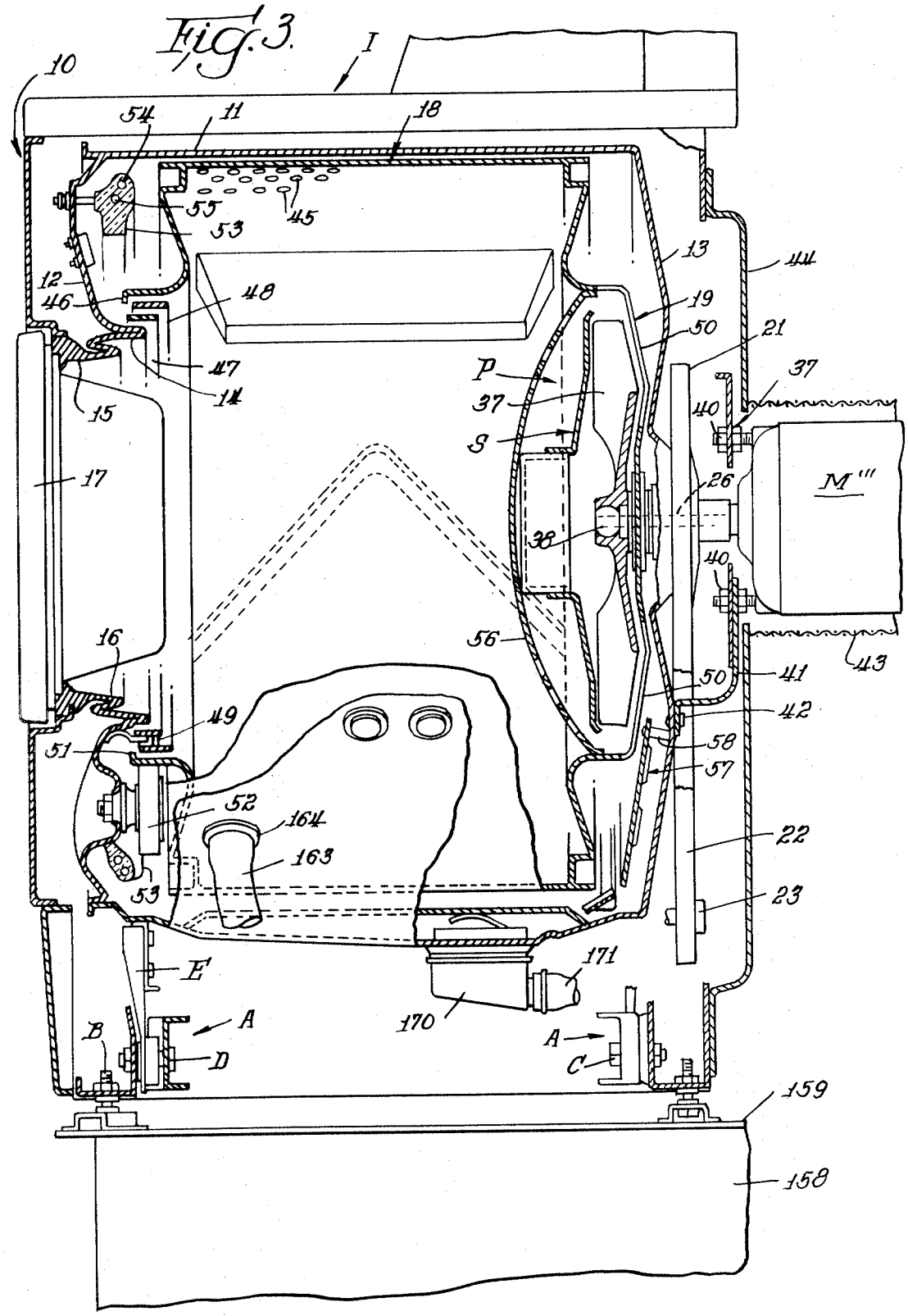

June 23, 1970  C. E. BEHRENS  3,516,174
CONTROL ARRANGEMENT FOR DRY CLEANING MACHINES
Filed Feb. 26, 1968  7 Sheets-Sheet 3
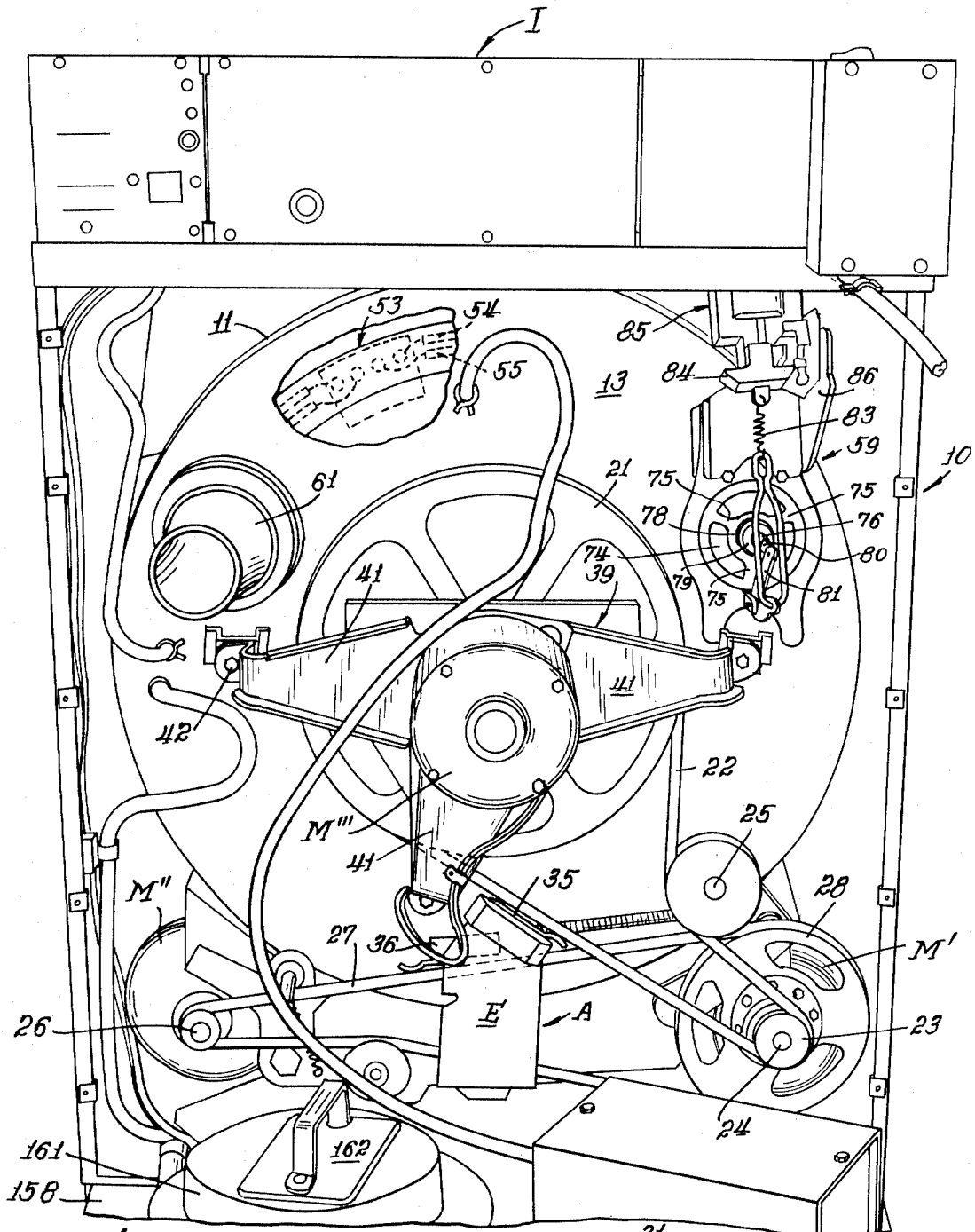
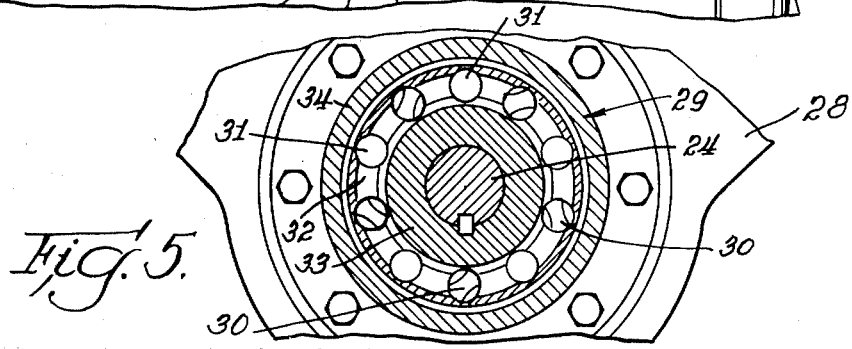

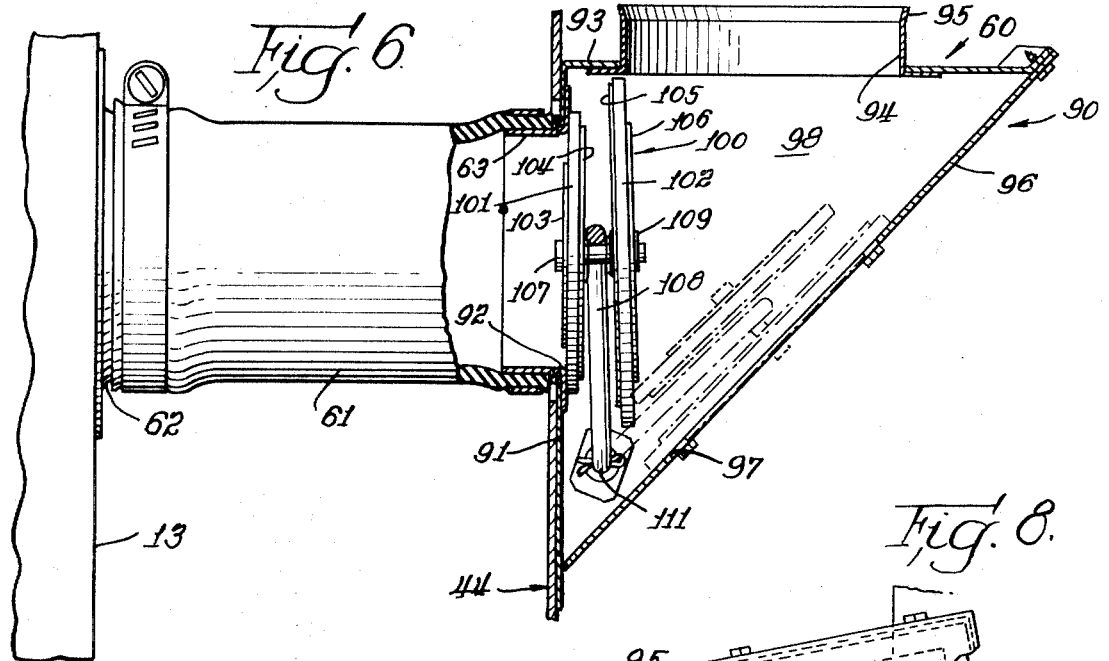

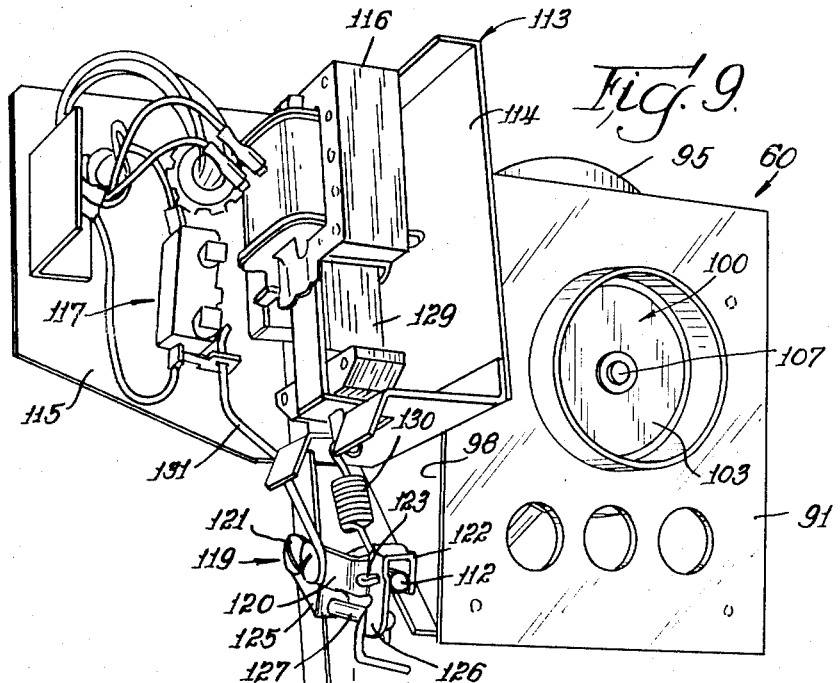

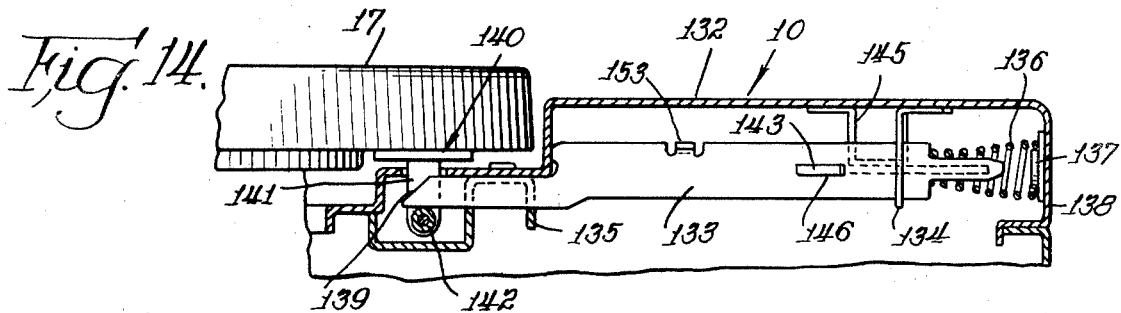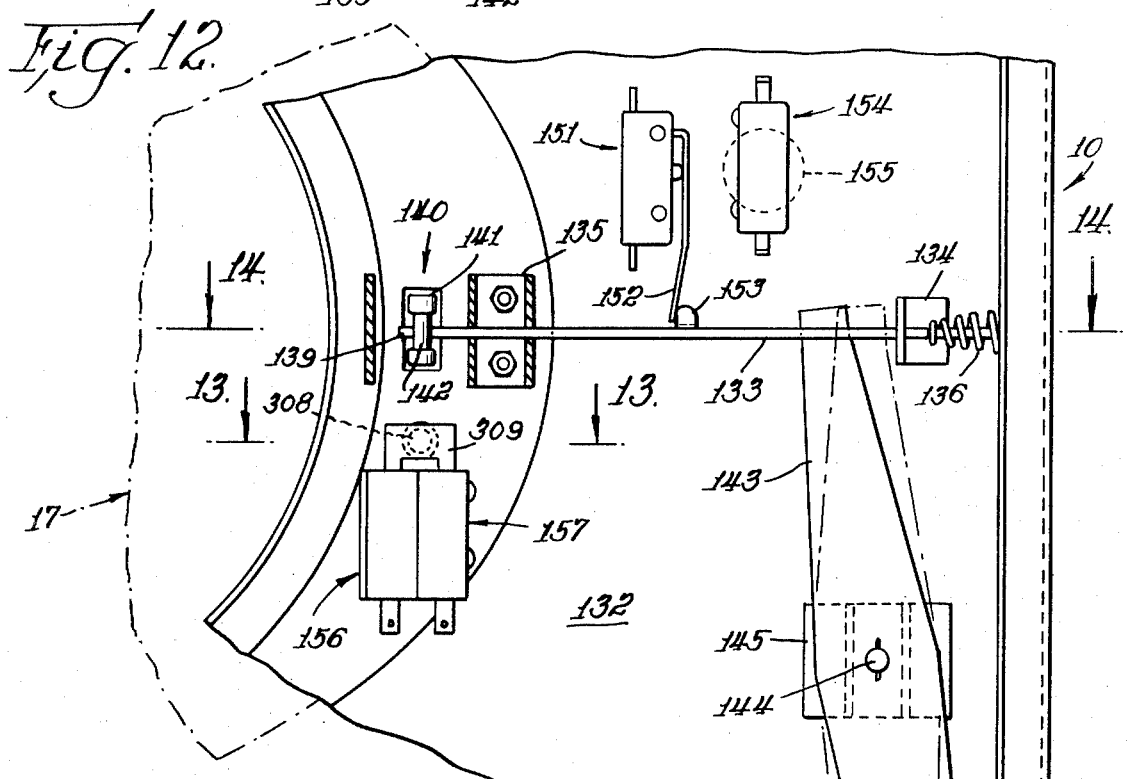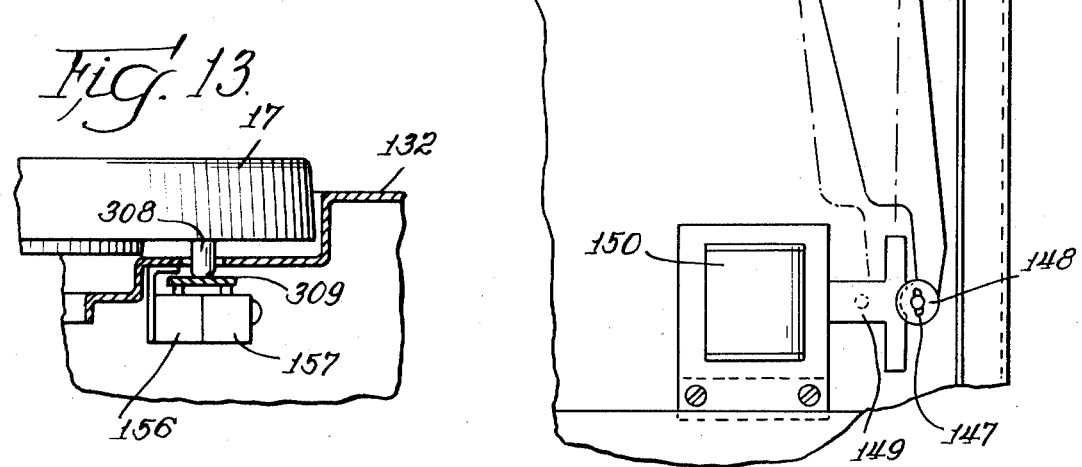

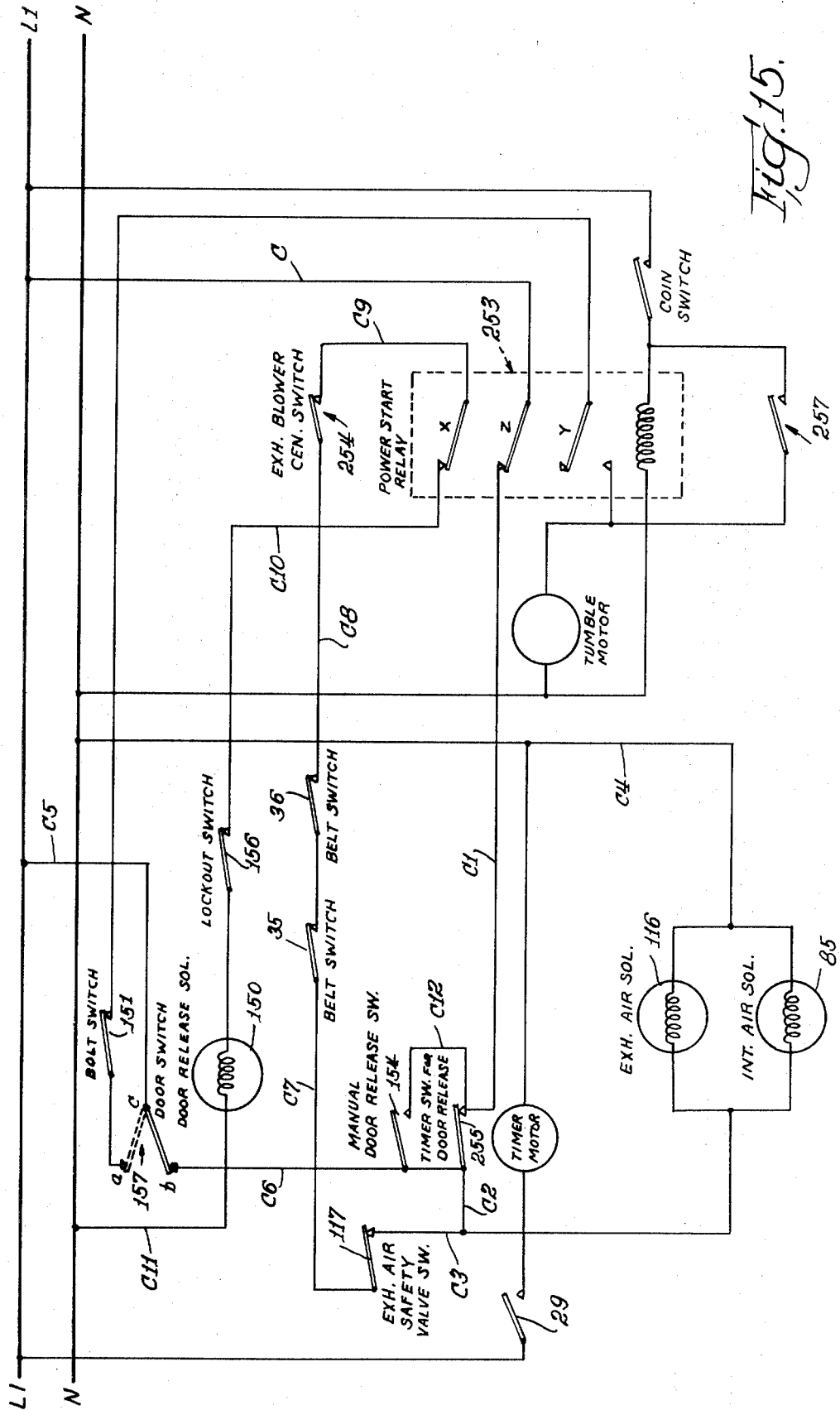

United States Patent Office 3,516,174
Patented June 23, 1970

3,516,174
CONTROL ARRANGEMENT FOR DRY CLEANING MACHINES
Curtis E. Behrens, Effingham, Ill., assignor, by mesne assignments, to Fedders Corporation, a corporation of New York
Filed Feb. 26, 1968, Ser. No. 708,044
Int. Cl. F26b *19/00, 21/00*
U.S. Cl. 34—45           18 Claims

ABSTRACT OF THE DISCLOSURE

A dry cleaning machine having ventilation arrangement provided by a motorized exhaust fan and an exhaust valve, the fan being operative, in the open position of the valve, to draw room air into an open access door of the machine, through the machine and the exhaust valve to the exterior of a building housing the machine. A safety-interlock system is provided for preventing exposure of the operator to dry cleaning solvent fumes and includes a first circuit for energizing a solenoid operating the exhaust valve to the in-draft open position, and a second circuit for a solenoid releasing a door lock, completion of the first circuit being accomplished by the operator pushing a door lock release button to close a switch, the exhaust air valve opening movement closing another switch to complete the second circuit to thereby energize the door lock release solenoid so that the door can only be opened when the exhaust valve is in its open ventilating position.

---

This invention relates to dry cleaning machines and more particularly to a new and improved door control arrangement for dry cleaning machines.

Dry cleaning machines employ toxic fluid solvents and a ventilation system is conventionally provided to exhaust solvent vapors from the machine through a duct to the exterior of the building in which the machine is located. The ventilation system includes a continuously operative motorized fan or blower located in the duct and operative, when the door of the machine is open, to draw room air into the machine to mix with the solvent vapors, the mixture flowing through an exhaust valve of the machine into the duct to the building exterior. The exhaust valve is normally closed during operation of the machine to prevent loss of solvent vapors and is actuated to its open position by energizing a solenoid connected to the valve and located in an electrical circuit completed by closing a switch upon energization of a door lock release device, controlled by the operator, to open the door. Should the valve solenoid fail, the exhaust valve remains closed, and whereas the door is open, the operator will be exposed to the solvent vapors emanating from the machine.

An object of the invention is to provide a new and improved door control arrangement for a dry cleaning machine.

Another object of the invention is to provide a new and improved door control arrangement for a dry cleaning machine employing a ventilation system including an exhaust valve movable to open position to vent the machine and thereby controlling releasing operation of the door lock.

Another object of the invention is to provide a new and improved door control arrangement for a dry cleaning machine employing a ventilation system including an exhaust valve electrically energizable to move the valve to an open position to vent the machine and thereby provide for electrically energizing a door lock release device.

A specific object of the invention is to provide a new and improved door control arrangement for a dry cleaning machine having a ventilation system including a continually operative motorized suction fan, and an exhaust valve having a solenoid located in a first circuit and energizable for opening the valve, and a door lock mechanism activated by a solenoid located in a second circuit and energizable to release the mechanism to permit opening of the door by the machine operator, the arrangement being characterized by the first circuit including a switch closable to energize the exhaust valve solenoid with consequent movement of the valve to open position closing a switch in the second circuit effective to energize the solenoid to release the door lock mechanism.

These and other objects and advantages of the invention will appear more clearly from the following specification in connection with the accompanying drawings, in which:

FIG. 3 is a vertical sectional view of one of the machines, said section being taken along line 3—3 of FIG. 1, and illustrating interior parts of the machine including a fluid-containing receptacle, a fabric-receiving basket, an air-circulating fan, and means for rotatably mounting the basket and fan on the receptacle;

FIG. 4 is a rear elevational view of the machine shown in FIG. 3, illustrating the drive arrangements for rotating the basket and fan and including belt and pulley drives;

FIG. 5 is an enlarged sectional view of a one-way clutch associated with the basket-rotating belt and pulley drive;

FIG. 6 is an enlarged side elevational view of the exhaust valve of the machine shown in FIG. 2, said view being partly in section to more clearly illustrate the movable air-flow diverter gate thereof;

FIG. 7 is a front elevational view of the valve shown in FIG. 6, the front plate of the valve housing being removed to more clearly illustrate the movable gate;

FIG. 8 is a side elevation of the valve shown in FIG. 7 and illustrating the mechanical and electrical control components for operating the valve;

FIG. 9 is a perspective view of the valve shown in FIGS. 6–8;

FIG. 10 is a view illustrating a portion of the mechanical control components of the valve, said view being taken on line 10—10 of FIG. 8;

FIG. 11 is a vertical sectional view of the inlet air valve shown in FIGS. 2 and 4;

FIG. 12 is a rear view of a portion of the door and door-mounting front panel of the machine shown in FIGS. 1 and 3 and illustrating the door-locking mechanism and control means therefor;

FIG. 13 is a horizontal sectional view of a switch-actuating arrangement associated with the door lock mechanism controls, and said section being taken on line 13—13 of FIG. 12;

FIG. 14 is a horizontal sectional view of the door-locking mechanism of FIG. 12, said section being taken on line 14—14 of FIG. 12; and FIG. 15 is a diagrammatic view of the electrical door control arrangement of the dry cleaning machine;

Figure 1:
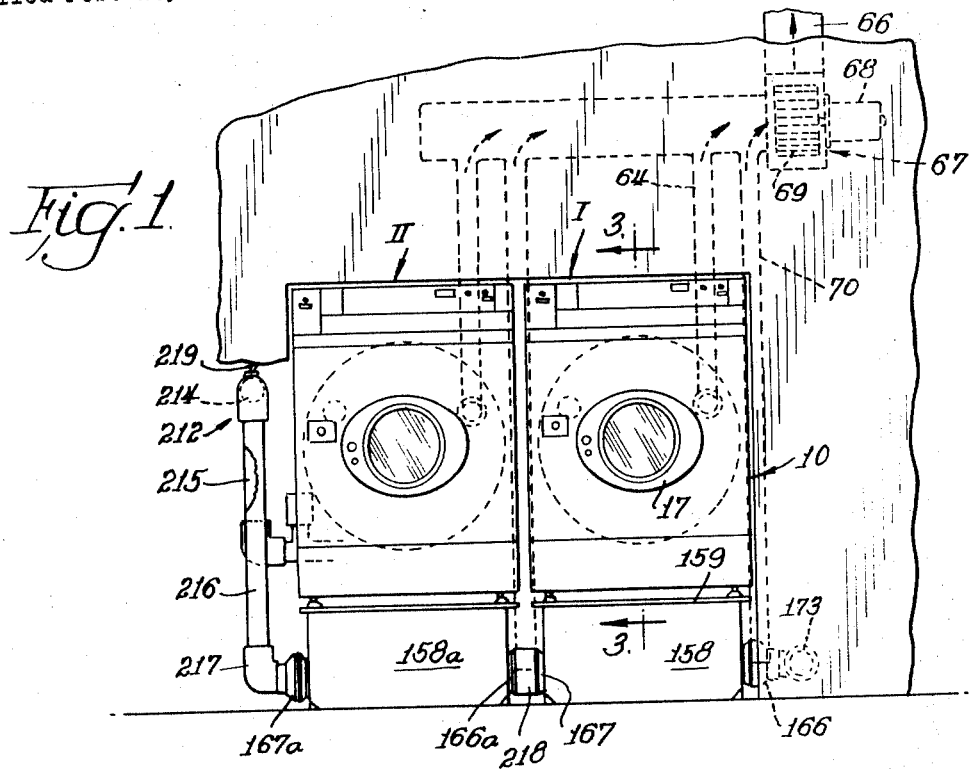
FIG. 1 is a front elevation of a dry cleaning system including two combination cleaning and drying machines, and a ventilating arrangement therefor.
Figure 2:
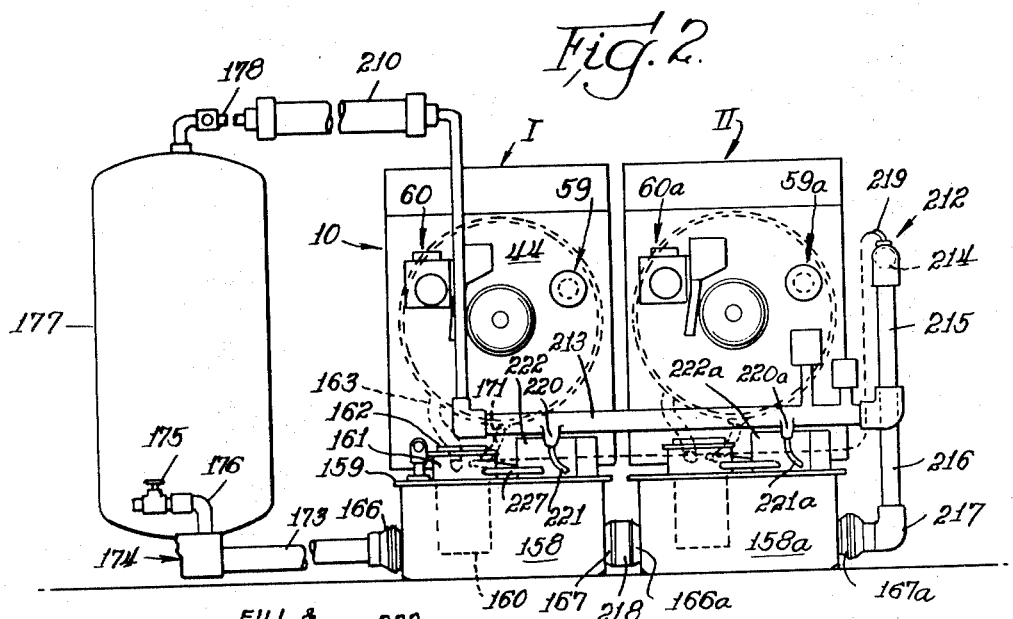
FIG. 2 is a rear view of the dry cleaning system and including air inlet and exhaust valves of the machines forming portions of the ventilating arrangement.

Referring now to the drawings, FIGS. 1 and 2 illustrate a dry cleaning system adapted for a plurality of combination fabric-cleaning and drying machines indicated at I and II, although the system may be employed with a single machine. As each of these machines are identical in construction and operation, it is believed the description of one of the machines (machine I) will be adequate to an understanding of each machine structure and operation. Identical structural parts of machine II are designated with the same numeral as machine I but with the suffix a. The structure of machine I is illustrated in FIGS. 3, 4, and 5 and comprises a cabinet 10 receiving a cleaning fluid-containing receptacle in the form of an imperforate cylindrical casing or tub 11 having a front wall 12 and a rear wall 13. The tub 11 is supported by a suspension system of the inverted pendulum type generally indicated at A mounted on a base structure B, the suspension system A comprising pivots C and D attaching the tub to the base structure B for operating movement of the tub, the pivots C and D being directly below the center line of the tub and being connected to the bottom of the tub by a pair of front and rear brackets, one of which is shown at E. Control springs (not shown) can be located on opposite sides of the tub, and these springs, in conjunction with an hydraulic damper assembly, are effective to control the tub movement during rotation of a cylindrical fabric-containing basket or drum 18 at high speed with an unbalanced load of fabric, such as clothes, in the basket. The suspension system arrangement of the tub is more particularly shown and described in U.S. Pat 2,978,892 issued Apr. 11, 1961. The front wall 12 of the tub 11 is provided with an access opening 14 and a corresponding opening 15 is in the cabinet 10. A flexible convoluted gasket 16 extends between and connects the annular portions of the front walls of the tub and cabinet defining two openings, and the cabinet is provided with a door 17 to close the opening in the tub.

The basket or drum 18 is disposed in the tub 11 for the reception of fabric to be cleaned and dried and the basket is supported by means of a spider 19, forming a portion of the rear wall of the drum, on a sleeve shaft 20 fixed to the drum and rotatably mounted on the rear wall 13 of the tub 11 for rotation of the drum 18. A pulley 21 is fixedly secured to the shaft 20 to rotate the drum and receives a belt 22 engaging a driving pulley 23 connected to the driven shaft 24 of an electric motor M' mounted on the base B. An idler pulley 25 is supported for pivotal movement and is spring-actuated to bear against the belt 22. A second motor B" is mounted on the tub 11 and has its drive shaft coupled to a pulley 26 engaging a belt 27 surrounding a pulley 28 on the driven shaft 24 of the motor M'. As shown in FIG. 4, a one-way clutch 29 is disposed between the shaft 24 and pulley 28 and comprises a plurality of sprags 30 and rollers 31 carried by a cage 32, the sprags having wedging engagement with a spaced motor hub 33 and collar 34 upon rotation of the pulley 28 in a counter clockwise direction when the motor M' is operative. As a result, this clutch action drives the motor shaft 24 through the keyed hub 33 and thereby rotates the pulley 23 to turn pulley 21 and basket 18 at a low clothes-tumbling speed (46 r.p.m.) for a fabric-cleaning operation. During this operation, the motor M' is deenergized and acts as a jackshaft. After a predetermined time period, the motor M' is energized and its shaft 24 will rotate in a counterclockwise direction. Since the motor M" is also energized, the clutch 29 will overrun the pulley 28 and drive the basket 18 at a high speed, approximately 285 r.p.m. Since the hub 33 is keyed to the motor shaft 24, the motor M' is directly driving the basket at a speed effective to extract the cleaning fluid from the fabrics.

The belts 22 and 27 are in direct contact with conventional belt switches 35 and 36, which are electrically wired in series with a door release circuit to be described. These switches must be closed to complete this circuit, thereby preventing opening of the door and removal of the wet clothes from the basket when belt failure occurs.

A blower fan 37 is positioned within the basket 18 and connected to one end of a shaft 38 extending through the sleeve shaft 20 supported on the rear wall 13 of the tub 11 and rotatably mounting the basket 18. The shaft 38 is connected to the drive shaft of a motor M''' positioned on a mounting bracket 39 and secured thereto by bolts 40, as shown in FIGS. 3 and 4, the bracket 39 having laterally extending arms 41 bolted as at 42 to the rear wall 13 of the tub. The motor is received within a housing 43 forming a centrally located portion of the rear wall 44 of the cabinet. The described blower fan and basket mounting arrangement permits independent or concurrent rotation of the fan and basket.

Referring to FIG. 3, the cylindrical wall of the basket 18 is perforated to provide openings 45 therein. The basket front wall is provided with an opening 46 spaced from the access opening in the front wall 12 of the tub 11. An annular ring 47 is suitably attached to the front wall 12 of the tub 11, and a second annular ring 48 is attached to the ring 47 and spaced therefrom by pins or rivets 49. The rear wall of the basket 18 is provided with a pocket P formed by the legs of the spider 19 merging with the cylindrical portion of the basket extending about the rotational axis of the basket, the pocket P having a plurality of openings 50 defined by the legs of the spider 19. The front of the basket 18 has a cylindrical flange 51 defining the opening 46, and the front wall 12 of the casing 11 has a pair of bearing rollers 59 secured thereto to support the front of the basket. Air circulating means, in the form of the suction type blower fan 37, is rotatably mounted in the pocket P in the rear wall of the basket 18.

In FIGS. 3 and 4, an annular heater assembly 53 is fixedly secured to the front wall 12 of the tub 11 and includes an aluminum body having embedded annular armored type heating coils 54 and 55 suitably connected to a supply of electric current controllable to energize one or the other, or both, heating coils of the heater assembly during the drying operation of the machine. During this drying operation, the basket is rotated slowly to tumble the fabric and the fan is effective to cause the heated air to circulate and flow between the tub and basket and around the basket and through the perforations in the basket to dry the clothes in the basket. The heated air is then drawn through a perforated plate 56 and lint screen S by the fan and through the pocket P of the basket and through the openings 50 defined by the spokes of the basket rear wall spider 19 and into the space between the basket and the rear wall 13 of the tub to be recirculated in the machine. As it is contemplated the machine will be used with a dry cleaning solvent, such as perchlorethylene, vaporizable during the drying operation, a condenser, generally indicated at 57, is positioned adjacent the lower portion of the wall 13 of the tub 11 for condensation of the solvent vapors produced by the drying operation. The condenser passages are connected to a water inlet hose and conduct the water to a hose leading to a drain exteriorly of the machine. As seen in FIG. 3, the condenser is mounted on the inside of the rear wall 13 of the casing 11 by securing means 58.

Referring now to FIGS. 4 and 11, the drum 11 has the upper portion of its rear wall provided with an air shutter in the form of an air inlet poppet valve, generally indicated at 59, operative to permit air to enter the tub 11. As shown in FIGS. 2 and 6, an air exhaust diverter valve, generally indicated at 60, is mounted on the cabinet rear wall 44 and communicates with the tub interior by a connector hose 61 extending between the wall 44 and tub rear wall 13 with the terminal ends of the hose surrounding and being clamped to cylindrical flanges 62 and 63 of the walls to provide an air passage between the tub and valve. The function of the inlet valve 59 is to permit air to enter and flow through the tub so that all the non-condensible solvent vapors may be flushed and discharged from the machine through the exhaust valve 60 at the end of the drying cycle of the machine and carried away by a ventilating system. In addition, when the door is open, the exhaust valve 60 is controllable to be in open position to permit the flow of room air into the machine for mixture with the solvent vapors and discharge through the valve to the exterior of the building housing the machine. The valves 59 and 60 are normally closed during the cleaning and drying cycles of the machine.

The ventilating system includes an air intake opening in wall 13 of the tub 11, through which flow of air into the machine is controlled by valve 59, the air entering and mixing with the solvent vapors and the mixture then being discharged through the valve 60 into an air duct 64 (FIG. 1) and a plenum duct 65 and through an exhaust duct 66 into the atmosphere exterior of the building. The duct 65 has a blower 67, including an electric motor 68 and a fan 69, for causing air flow into and through the machine and into the ventilating system ducts. During operation of the blower fan, any vapor-laden air about the machine is also drawn through a scavenger duct 70 extending upwardly into the duct 65 for exhaust by the blower fan.

The poppet valve 59 is shown in detail in FIGS. 4 and 11 and comprises valve body or plate 72 secured to the wall 13 of the tub 11 and provided with an annular flange 73 fitting within an opening in the tub rear wall 13 and providing a seat for a flexible seal 74 within the tub to prevent air flow between the three spaced legs 75 of the valve body from the machine. The seal is fixed to one end of an activating rod 76 and is normally held engaged with the flange 73 by the rod being slidably mounted within a sleeve 77 secured to the radially inner ends of the legs 75, the rod having a surrounding spring 78 compressed between a flange on the sleeve 77 and a retainer washer 79 on the rod 76 to close the valve. The rod 76 is pivotally connected to a link 80 which is connected to one end of a lever 81 centrally pivoted to spaced ears on the valve plate 72, the other end of the lever 81 being connected by a wire link 82 to a spring 83 coupled to the plunger 84 of a solenoid 85 mounted on a bracket 86 fixed to the tub rear wall 13. The valve is shown in closed position in FIG. 11, the solenoid being deenergized at this time. Upon energization of solenoid, the plunger 84 will move upwardly to cause lever 81 to rotate to move rod 76 to disengage seal 74 from the flange 73 to permit air to flow into the tub 11 through the valve 59. When the solenoid is deenergized, the valve will close, as the compressed spring 78 will expand and the link and lever arrangement causes seal 74 to again seat against the flange 73.

Referring now to the exhaust valve 60 shown in FIGS. 1, and 6 to 10, inclusive, the valve comprises a housing 90 of triangular section as viewed in FIGS, 6, 7 and 8 and having its rear wall 91 provided with an opening 92 defined by the cylindrical flange 63 thereof; a top wall 93 having an opening 94 defined by an upwardly projecting cylindrical flange 95 received within the duct 64; and inclined removable front wall 96 extending between the top and rear walls and provided with an opening 97. The housing also includes spaced side walls 98 and 99 extending between and connected to the walls 91, 93 and 96 to provide a passage for air from the hose 61 and the interior of the machine to the opening 94 in wall 93 and to the ducts 64 and 65 and exhaust duct 66 of the ventilating system, or alternatively, to afford a passage for room air through the opening 97 in the front wall 96 to the ducts 64, 65 and 66.

Flow of air from the machine or room to the ventilating duct system is controlled by a gate or damper 100 pivoted on the side walls 98 and 99 of the valve housing for movement to positions covering the opening 92 or 97. More particularly, the gate 100 comprises seals 101 and 102 of a suitable material, such as acrylonitrile, the seal 101 functioning to close the opening 92 of the valve housing, and movement of the gate causing the seal 102 to close the opening 97 of the housing. The seal 101 is positioned between two metal plates 103 and 104 and the seal 102 between two similar plates 105 and 106. A clevis pin 107 extends through aligned openings in the seals and plates and also through a loop of a V-shaped activating lever 108, the pin having a cotter pin 109 in one end thereof to maintain the seals, plates and lever in assembly. The lever 108 has aligned portions 110 and 111 extending into the side walls 98 and 99 of the housing 90 for pivotally supporting the seals, the portion 110 extending outwardly of the housing and merging with an offset arm 112 movable to pivot the gate 100.

Actuating means for the valve gate 100 is mounted on a bracket 113 provided by angularly disposed walls 114 and 115 with the wall 114 being secured by screws to the wall 98 of the valve housing, and the wall 115 mounting a solenoid 116, a switch 117, and an angle bar 118, as shown in FIGS. 7-10. The bar 118 extends downwardly of the bracket and supports mechanism 119 operably connecting the solenoid, switch and gate-activating lever. More particularly, the mechanism 119 comprises a lever 120 pivotally mounted at one end on the bar 118 by a shoulder bolt 121, the lever is parallel to the arm 112 of the lever 108, and the arm 112 extends through a bifurcate or U-shaped end 122 of the lever 120 and is connected thereto by a cotter pin 123 so that relative movement of the levers can occur upon actuation of the lever 120 by the solenoid 116 and a spring 124. The lever 120 is formed with downwardly projecting spaced ears 125 and 126 respectively located adjacent the pivot 121 and at the bifurcated end 122, the ears having aligned openings for receiving a pin 127 fixed to the ears by cotter pins, as shown in FIGS. 8, 9 and 10. The coil spring 124 has its upper end hooked about an annular carrier 300 surrounding and slidable on the pin 127 and its lower end engaging a laterally extending arm 128 of the bar 118 so that, upon pivotal movement of the lever 120, the upper end of the spring 124 and the carrier 300 can move along the pin 127. The spring 127 normally positions the levers 108 and 120 as shown in FIGS. 8, 9 and 10 to insure the valve seal 101 of gate 100 closing the opening 92 of the valve housing as in FIG. 6. To move the valve gate to position its seal 102 to close the opening 97 of the housing, the solenoid 116 is energized to raise its plunger 129 and thereby spring 130 connected to the plunger and to the lever arm 112, so that the levers 108 and 120 rotate in a counterclockwise direction (FIG. 8). During this movement, the upper end of the spring 124 and its carrier 300 slides to the left along the pin 127. Also, switch 117 has its normally-open contacts closed by movement of a wire actuator 131 connected to the lever 120 by the loop end of the actuator engaging a shoulder screw on the lever.

It will be apparent that the valve-actuating arrangement locates the pivot 121 for the lever 120 with respect to spring 124 and to the forces exerted on the levers 108 and 120 by the spring 124, in a manner so that, when the spring is in its position, as shown, in spaced relation to the lever pivot 121, the spring will cause maximum leverage force on the valve gate 100 to insure seal 101 tightly closing the opening 92 of the housing 90. However, upon energization of the solenoid and movement of the levers in a counterclockwise direction (FIG. 8) to remove the valve gate from opening 92 and to close opening 97 of the valve housing, the upper end of spring 124 slides along the pin 127 to a position adjacent the lever pivot 121 to thereby diminish the spring force on lever 120 and unload the spring to relieve and decrease the force of the spring 130 necessary to return the solenoid to its deenergized position. Upon deenergization of the solenoid, the tension of spring 124 will cause the lever 120 to rotate in a clockwise direction and the upper end of the spring will slide along the pin 127 away from pivot 121 and to its extreme right position for exerting maximum leverage force on the lever 120 and thereby lever 108.

Referring to FIGS. 1, 12, 13 and 14, each of the machines I and II is provided with a door lock mechanism having electrically-operated and controlled components effective to prevent the machine operator opening the door during operation of the machine. This safety factor is important to prevent solvent vapors entering the room, containing the machines, with possible injury to the operator during the cleaning and drying cycles of the machine operation, or in the event the machines become inoperative due to a mechanical or electrical failure. More particularly, the door lock mechanical and electrical components are mounted on the rear of the front panel 132 of the cabinet 10 of the machine and comprise a door lock pin or latch 133 extending through and being slidably supported in a fixed guide plate 134 and a removable guide plate 135 the pin 133 being moved to the left in FIGS. 12 and 14 by a spring 136, surrounding the reduced end of the pin, the spring having one end engaged with a boss 137 on a flange 138 of the panel 132, and the other end of the spring engaging the pin to move the angular nose 139 of the pin 133 into the keeper 140 secured to the door 17. The keeper 140 comprises a U-shaped bracket 141 having a roller pin 142 rotatably supported by the ends of the arms of the bracket and engageable by the pin 133 to positively lock the door. The pin 133 is movable to the right, as viewed in FIGS. 12 and 14, by an activating bolt arm or lever 143 rotatably supported intermediate its ends by a pivot pin 144 positioned in a bracket 145, the arm 143 having its upper end received within a slot 146 in the latch and having its lower end provided with a slot 147 receiving a roll pin 148 secured to a plunger 149 of a solenoid 150. Energization of solenoid 150 is effective to rotate the lever 143 in a clockwise direction about pin 144 to cause the upper end of the lever to move the latch 133 from the keeper 140 and thereby to its door-unlocking position to permit opening of the door 17. Safety features are provided for insuring the inability of the operator unlocking and opening the door during machine operation or, in the event of failure of mechanical or electrical components of the machine during machine operation. More particularly, a bolt switch 151 having an actuating arm 152 engaging a laterally-extending tab 153 on the latch 133; a door release switch 154 actuated by a pushbutton 155 on the front of the machine by the operator; a lockout switch 156; and a door switch 157, all of these switches being arranged in electrical circuits to be later explained during the description of the operation of the electric circuit diagram of FIG. 15.

The cleaning fluid supply system utilized with the machines is disclosed in U.S. Pat. 3,273,256 issued Sept. 20, 1966, to C. E. Behrens and assigned to Fedders Corporation. Briefly described, the system has been designed to provide a constant flow of clean, filtered cleaning fluid or solvent, such as perchlorethylene, to each machine during the fabric-cleaning cycle, each machine having an overflow arrangement to expel the soiled solvent from the machine to a solvent storage base tank of the machine for flow of the solvent to a pump and then to a filter for removing soil and other impurities from the solvent and for recirculation of the cleaned solvent to the machine. The filtered solvent is supplied to each machine by a manifold providing a metered quantity of cleaning solvent to each machine with a proper solvent level or height being constantly maintained in the machines by the location of the solvent overflow pipe in the machine.

Referring now more particularly to the closed fluid supply system, machine I has its base structure B supported above and on a rectangular solvent storage tank indicated at 158, the tank including a top plate 159 enclosing the top of the tank and on which the machine is mounted. The top plate 159 of the tank is provided with a basket-type screen filter 160. A cylindrical header 161 is positioned on and may be welded to the top plate 159, the header extending upwardly and having its upper end closed by a removable cover 162 to prevent the escape of solvent vapors from the tank and filter.

The header 161 is provided with a laterally extending tubular portion for attachment to one end of a hose 163. As seen in FIGS. 2 and 4, the hose extends along the top of the tank and upwardly for connection to a tubular extension 164 of tub 11 and defining an opening 165 within the cylindrical wall of the tub located a predetermined distance above the bottom of the tub.

The opposite sides of the tank have substantially large, tubular extensions 166 and 167, the tubular extension 166 providing a fluid inlet passage for solvent entering the tank and the tubular extension 167 providing a fluid outlet for the solvent from the tank. Referring to FIG. 3, a sump elbow 70 is located in and connected to the bottom of the tub of the machine, the elbow 170 having a laterally extending tube receiving one end of a hose 171.

Solvent is supplied to the tub of the machine through the hose 171 and, as the solvent enters the tub, the solvent rises to a predetermined level defined by the opening 164 in the side wall of the tub and through which the solvent overflows from the tub into the hose 163 and the lint filter basket 160, lint being filtered from the solvent and the solvent then being added to and mixed with solvent circulating through the tank by way of tubular extensions 166 and 167.

The tubular fluid outlet extension 167 of the base tank of machine I is connected to a pipe 173 effective to direct the soiled solvent to a circulating pump 174, the pump causing the solvent to be forced under pressure through an open check valve 175 and a pipe 176 into the bottom of the filter 177. The soiled solvent enters the filter 177, adjacent the bottom thereof, through the pipe 176, and filtered clean solvent flows from an outlet at the top of the filter into pipe 178 elevated above the top of the filter. Solvent flows from the filter 177 into the pipe 178 which extends through a water-cooled heat exchanger 210 and to the pipe 211 connected to a horizontal manifold pipe 213. An inverted U-shaped assembly 212 includes a horizontal pipe 214 and two vertical pipes 215 and 216, the pipe 213 being connected to pipe 211. The pipe 215 functions as a standpipe and is connected to pipe 213 and the solvent is forced upwardly through pipe 215 and flows into pipe 214 nad then downwardly into the overflow pipe 216, pipe 216 terminating in a pipe 217 positioned in a horizontal plane below that of pipe 213. The pipe 217 has its outlet end connected to the inlet tubular extension 167a of the side wall of the solvent storage base tank 158a of machine II so that the filtered solvent flows into and through the base tank of machine II for mixture with the soiled solvent entering the tank from the overflow hose and the lint filter basket of machine II when machine II is in operation, the solvent then flowing through a pipe 218 connecting outlet tubular extension 166a with the inlet tubular extension 167 of base tank 158 of machine I for mixture with the soiled solvent overflowing the tub of machine I and for flow therethrough and the outlet tubular extension of tank into the pipe 173 to the pump for recirculation through the filter, the assembly 212, and the storage base tanks of machines I and II. A vacuum breaker hose 219 is connected to the top of pipe 214 and also to the headers 161 and 161a of the storage tanks 158 and 158a. The function of the standpipe 215 is to provide a pressure, caused by an active head of solvent, for feeding solvent by gravity into the tanks and tubs of the dry cleaning machines I and II.

Solvent is fed into the tub of each machine by the manifold pipe 213 provided with downwardly extending tubular portions 220 and 220a connected respectively to hoses 221 and 221a which are connected to identical diverter valve assemblies 222 and 222a. Each diverter valve assembly comprises three solenoid-operated valves 223, 224 and 225 with the valve 255 directing solvent from the hose 221 into and through the valve assembly 222 and into the hose 171 and the tubular extension 170 of machine I, the solvent flowing into the machine until it reaches a level equal to the height of the overflow opening 164 in the tub of the machine for flow therefrom into the hose 163 and into the filter basket and storage base tank.

Figure 16:
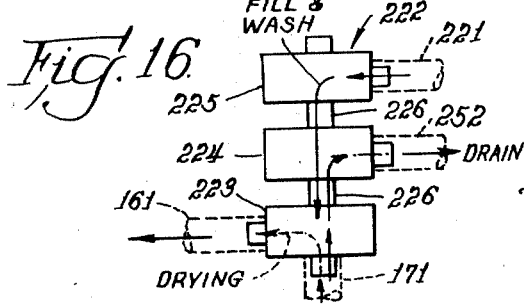
FIG. 16 is a diagrammatic view of a control valve arrangement for the dry cleaning fluid solvent.

Referring to the valve assembly 222, the flow of the solvent through the valve assembly 222 is diagrammatically shown in FIG. 16 in which, briefly described, the fluid enters the assembly through the hose 221 from pipe 213 and flows through the valve 225 into a common passage 226 through the valve assembly for all of the valves of the assembly, valves 224 and 223 having solenoids (not shown) which are deenergized and at this time, these valves being ineffective to divert the solvent from the passage. Accordingly, assuming the valve 224 is opened by energization of its solenoid and the solvent passes therethrough and into and through the passage 226 to flow outwardly of the valve assembly and into and through the hose 171 into the tub of the machine during the fill and cleaning cycle of the machine. This flow of the solvent is diagrammatically illustrated in FIG. 16. During the drain and extraction periods of the cleaning cycle of the machine, the valves 225 and 223 have solenoids (not shown) which are deenergized so that these valves are closed, and the valve 224 is open as its solenoid is energized so that the solvent flows from the tub sump and through hose 171 into the passage 226 of the valve assembly and through valve 224 into the hose 227, connected to the header 161, for flow of the solvent into the storage base tank. During the drying cycle, the valve 223 and valve 224 are open and the valves 225 are closed. The solvent vapors are condensed by the condenser 57 into liquid solvent which drains from the hose 171 into the passage 226 to flow through open valve 223 into a hose connected to the header 161.

Referring now to FIG. 16, it will be assumed that the tub of machine I is empty of solvent and that solvent is continuously flowing through the manifold pipe 213, the standpipe 215, and overflow pipes 214 and 216 into and through the storage tanks of the machines. As the solenoid of the valve 225 is deenergized, the solvent will not flow from the hose 221 into machine I. To permit the solvent from the manifold pipe to enter the hose and the machine, the solenoid of valve 225 is energized to open the valve. At this time, it may be noted that the valve 225 is open so that solvent entering the hose 221 flows through the valve and into the valve 224. As the solenoids of valves 224 and 223 are deenergized, the solvent flows through the aligned chambers of the valves and through hose 171 into the tub of the machine.

Accordingly, from the description of the operation of the diverter valve assembly 222, it will be apparent that the solvent may flow from the manifold pipe to either or both of the machines, depending upon the selective opening or closure operation of the valve assemblies 222 and 222a as desired by the operator of the dry cleaning system. After the clothes are cleaned by the solvent for a predetermined time period, and assuming machine I is only in use, the tub of machine I may be drained by closing the valve 225 and opening the valve 224 while maintaining the valve 223 closed, the solvent then drains from the tub of the machine through the hose 171, chamber of valve 223 and, as the closure member of valve 224 is now open, the solvent is diverted into and passes into hose 227 extending through one side of the header 159 and into the filter basket and the storage base tank for circulation by the pump to the filter 177.

The present dry cleaning system is adapted also to dry the clothes and, for this purpose is provided with the heater assembly 53 and fan 37 to cause the heated air to be circulated throughout the dryer for drying the cleaned clothes. During this time, cooling water may be circulated through condenser 57 to condense the vaporized solvent, the solvent flowing down the walls of the tub and into the hose 171. At this time, the valve 225 is closed and the solenoid of valve 223 is energized to open valve 223 so that the condensed solvent flows through the hose 171 into the valve 223 and into a hose connected to the header 159 of the tank 152 for passage of the solvent into the lint basket and thence into the storage tank 152 of the machine.

In this dry cleaning system, each machine may be operated independently of the other machine and, for this purpose, each machine is provided with an electrical control system, including a sequential controller or timer arrangement, for operation of the machine through a cleaning cycle, a drain cycle, and a drying and reclaiming cycle. Briefly described, after the clothes have been deposited in the basket of machine I, and the door is closed and locked by latch 133, the cleaning cycle is initiated by the solenoid of valve 225 being energized to open the valve to allow solvent flow through the valve assembly into the hose 171 for entry into the tub of the machine and for overflow through the pipe 164 into the filter basket and the storage base tank for mixture with the solvent flowing through the tank and circulation to the filter and to the machine. During this time, the motor M″ is energized to slowly rotate the basket to tumble the clothes in the basket for cleaning the clothes in the solvent in the tub. After a specific time has elapsed, the solenoid of the valve 225 is deenergized and the solenoid of valve 224 is energized to open the valve to divert solvent flowing from the machine through the hose 171 into the drain hose 252 and into the lint filter basket and the storage base tank of the machine. After a predetermined time, the motor M′ is energized to rapidly rotate the basket to extract the solvent from the clothing in the basket, the solvent draining from the machine through open valve 224 into the base tank of the machine. After the drain cycle of the machine, the motor M′ and motor M″ are energized, and heater assembly 53 is also energized to provide heated air which is circulated by the fan 37 through the basket to dry the clothes. Due to the circulated heated air, any solvent or water, remaining in the clothes and in the machine, vaporizes and is condensed by the condenser 57 into liquid form. At this time, the solenoid of the valve 223 is energized so that the drops of the condensed water and solvent mixture drips from the machine through the hose 171 into the valve 223 and then into the tank 158.

Following the drying period, a cool-down period occurs, in which the energization of the drive motor M′ slowly rotates the basket; motor M‴ is energized to rotate the basket fan, the heater is deenergized, and circuits are completed to energize the air inlet and exhaust valve solenoids 85 and 116 to open the valves to provide aeration of the garments, to remove non-condensible solvent vapors, and to cool down the machine.

The new and improved door control arrangement is directed to automatically-controlled door-locking means operative to prevent opening of the door in the event the described ventilation system fails and including a safety-interlock electrical control for the door-locking means to insure the ventilating fan motor and exhaust air valve solenoid are energized prior to energization of the solenoid releasing the door-locking means. An equally important feature of the door-control arrangement is that, when the machine is not in use and the door is closed, the exhaust air valve solenoid is deenergized to close the valve to prevent withdrawal and loss of solvent vapors from the machine by the suction of the exhaust fan in the case of valve leakage. It will be apparent that the arrangement provides for safeguarding the operator by being operative to energize the exhaust valve solenoid to open the valve to establish an in-draft of air at the door when the door is opened automatically at the conclusion of machine operation, or when the operator opens the door by pressing the door release button to load or unload the machine. In addition, the design of the exhaust valve, and particularly its location exteriorly of the machine, eliminates lint accumulating on the valve with possible failure of the valve to close and loss of solvent vapors.

Attention is directed to FIGS. 6–10, inclusive, illustrating the exhaust valve 60; FIGS. 12, 13 and 14 illustrating the door control mechanical and electrical components; and FIG. 15 showing diagrammatically the electrical valve and door control circuits. Referring to FIG. 15, the electric circuit diagram indicates the condition of the various electrical control components at the conclusion of the cleaning and drying operations of the machine, the machine being in its "Off" position and the automatic door having been opened by energization of the door release solenoid 150.

Prior to energization of the door solenoid 150 automatically by timer switch 255, a circuit must be established to energize the inlet and exhaust air valve solenoids 85 and 116, the circuit including line L1; conductor C; closed contacts of relay switch Z of the power start relay 253; conductor C1; contacts of switch 255 closed, at the conclusion of machine operation, by a cam rotatable by timer motor TM; conductor C2 and C3; coils of solenoids 85 and 116; conductor C4, and line N. Upon opening of the inlet and exhaust valves, the exhaust valve-operating lever 120 will immediately close the contacts of the exhaust air valve safety switch 117 to complete a circuit through conductor C7; switches 35 and 36; conductor C8; switch 254; conductor C9; relay switch X; conductor C10; switch 156; to door release solenoid 150; C11 and line N for energizing the door release solenoid. At the time of the opening of the door, the exhaust valve solenoid 116 and inlet valve solenoid 85 are kept energized by the circuit including line L1; conductor C5; closed contacts b–c of door switch 157; conductor C6, C2 and C3; closed contacts of switch 117; conductor C7; belt switches 35 and 36; conductor C8; closed contacts of the exhaust blower motor centrifugal switch 254; conductor C9; closed contacts X of power start relay 253; conductor C10; closed contacts of lockout switch 156; door release solenoid 150; conductor C11; and line N. When the solenoid 150 is energized, the lever 143 rotates to move latch 133 to free the latch from the keeper 140 and the door opens automatically. The operator can then unload the clothes from the machine with the assurance that the ventilating blower creates an in-draft of air to remove any solvent vapors through the exhaust valve and ducts to the building exterior.

When the door is opened, a pin 308 (FIG. 13) on and projecting inwardly of the door is released from its engagement with a U-shaped leaf spring actuator 309 having its arms release their actuating engagement with the switch button of the door switch 157 to open contacts a–c of this switch to prevent any possibility of circuits for the cleaning and drying functions of the machine, and which include this switch, to become established. It will be apparent that, should the door release button 155 be pushed during the operation of the machine, the door release solenoid will not be energized since the X and Z switch contacts of the power start relay, in the solenoid circuit, are open during machine operation. Upon conclusion of the machine operation, the timer contact 257 opens and deenergizes the power start relay thus closing contacts X and Z on this relay to complete the door release circuit.

It is desirable to keep the door closed when the machine is inoperative so that the exhaust air valve is closed to prevent suction of solvent vapors from the machine. However, the control arrangement provides for the exhaust air valve solenoid to be energized to open the valve whenever the door is opened to load or unload the machine to insure an in-draft of room air into and through the machine to the ventilating system. More particularly and assuming the door is locked during the idle period of the machine as in FIGS. 12, 13 and 14, the operator presses the door release button 155 to close switch 154 to provide a circuit energizing the inlet and exhaust valve solenoids 85 and 116 to open the valves, opening of the exhaust valve closing the switch 117 to provide a circuit for energizing the door release solenoid. The circuit energizing the valves includes line L1; conductor C; closed switch contacts Z of power start relay 253 which is deenergized; conductor C1; conductor C12; closed contacts of switch 154; conductors C6, C2 and C3; solenoids 85 and 116; C4; and line N. When solenoid 116 is energized, switch 117 closes and the circuit to the door release solenoid is completed, the circuit including line L1; conductor C; switch contacts Z of the power start relay 253; C1; C12; door release switch 154; C6; C2; C3; contacts of switch 117; C7; belt switches 35 and 36; C8; centrifugal switch 254; C9; switch contacts X of relay 253; C10; lockout switch 156; solenoid 150; C11 to line N.

Once power start relay 253 has its relay coil energized, it will continue to provide an energizing and holding circuit for the relay and thereby initiate the timer control of the sequential operation of the cleaning and drying cycles of the machine.

From the foregoing, it will be apparent that the new and improved door control arrangement is advantageous in safeguarding the operator of the dry cleaning machine from exposure to the cleaning solvent vapors.

What is claimed is:

1. A fabric-treating machine comprising a liquid container; a basket rotatably mounted in said container; an access door for said container; a latch for holding said door in closed position; means for operating said latch to release said latch; means operable to exhaust liquid vapors from said container and including a valve; means controlling operation of said valve to open said valve; and means controlling operation of said latch-releasing means and dependent on operation of said valve.

2. A fabric-treating machine as defined in claim 1 wherein said latch-operating means includes electrically-operable means, and operation of said valve controls energization of said electrically-operable means.

3. A fabric-treating machine as defined in claim 1 wherein said valve control means includes electrically-operable means energizable to operate said valve and thereby said latch-releasing control means.

4. A fabric-treating machine as defined in claim 2 wherein said vapor-exhausting means includes a fan, and an electric motor energizable to operate said fan, and an electrical circuit for energizing said electrically-operable means including a first switch closable upon energization of said motor, and a second switch in series with said first switch and closable upon operation of said valve.

5. A fabric-treating machine as defined in claim 2 wherein operation of said valve closes a switch in an electric circuit for energizing said electrically-operable means.

6. A fabric-treating machine as defined in claim 1 wherein said vapor-exhausting means also includes a fan, and a motor operating said fan; and said latch-releasing control means is also dependent on energization of said motor.

7. A fabric-treating machine as defined in claim 1 including means for heating air and for circulating heated air in said container to vaporize liquid in the fabric during a drying operation of the machines.

8. A fabric-treating machine as defined in claim 1 wherein said valve control means includes electrically-operable means energizable to close said valve, and said latch-operating means includes electrically-energizable means to release said latch, and an electric circuit for said electrically-energizable means and including a first switch closed by movement of said valve to its closed position and a manually-operable second switch in series with said first switch.

9. A fabric-treating machine as defined in claim 8 including a timer having a switch in series relation to said first and second switches and closable by said timer.

10. A fabric-treating machine as defined in claim 1 including means for heating air and circulating heated air in said container to vaporize liquid in the fabric during a drying operation of the machine, and wherein said valve control means includes electrically-operable means energizable to close said valve, and said latch-operating means includes electrically-energizable means to release said latch, and an electric circuit for said electrically-energizable means and including a first switch closed by movement of said valve to its closed position, and a manually-operable second switch in series with said first switch and operable to complete said circuit to energize said electrically-energizable means upon completion of said drying operation.

11. A fabric-treating machine as defined in claim 1 including means for heating air and circulating heated air in said container to vaporize liquid in the fabric during a drying operation of the machine, and wherein said valve control means includes electrically-operable means energizable to close said valve, and said latch-operating means includes electrically-energizable means to release said latch, and an electric circuit for said electrically-energizable means and including a first switch closed by movement of said valve to its closed position, and a manually-operable second switch in series with said first switch and a timer having a switch in series relation to said first switch and in parallel with said second switch and closable by said timer to complete said circuit to energize said electrically-energizable means upon completion of said drying operation.

12. A fabric-treating machine as defined in claim 1 wherein said valve control means includes electrically-operable means energizable to close said valve control means, and said latch-operating means includes electrically-energizable means to release said latch, and an electric circuit for said electrically-energizable means and including a first switch closed by movement of said valve to its closed position, and a timer having a second switch in series with said first switch and closable by said timer.

13. A fabric-treating machine as defined in claim 12 including means for heating air and circulating heated air in said container to vaporize liquid in the fabric during a drying operation of the machine, and wherein said second switch is closable by said timer upon completion of said drying operation.

14. A fabric-treating machine as defined in claim 1 including a motor; means providing a driving connection between said motor and said container; and wherein said vapor-exhausting means includes an exhaust fan, and a motor operating said fan; and said latch-releasing control means is also dependent on energization of said exhaust fan motor and operation of said driving connection means.

15. In a fabric-drying machine, a container, a fabric receiving basket rotatably mounted in said container; a first electric motor for rotating said basket; an access door for said container; latch means for holding said door in closed position; means for operating said latch means to release said latch means including electromagnetic means; means for heating air and for circulating heated air in said container to vaporize liquid in the fabric; venting means for said container comprising means for exhausting vapors from the interior of said container and including a fan, a second electric motor operating said fan, normally-closed valve means controlling the exhaust of vapors from said container by said fan, and electromagnetic means for operating said valve means to its open position; a first electric circuit for energizing said valve-operating electromagnetic means; and a second electric circuit for energizing said latch-releasing electromagnetic means including a centrifugally-operable first switch connected to said second motor and closable during energization of said second motor, and a normally-open second switch closable upon energization of said valve-operating electromagnetic means, said switches being arranged in series relation in said second circuit.

16. A fabric-drying machine as defined in claim 15 including a third electric circuit for energizing said first motor including a closed third switch, said third switch being opened by operation of said latch-releasing means to prevent energization of said first motor.

17. A fabric-drying machine as defined in claim 15 including means for controlling the drying operation of said machine and having a third switch, in series with said first and second switches, closable on completion of the drying operation of the machine, to establish said second electric circuit to energize said electromagnetic means to release said latch means.

18. A fabric-drying machine as defined in claim 17 including a third electric circuit for energizing said first motor including a closed fourth switch, said fourth switch being opened by operation of said latch-releasing means to prevent energization of said first motor.

References Cited

UNITED STATES PATENTS 3,388,567   6/1968   Oles _____ 34—45

JOHN J. CAMBY, Primary Examiner

U.S. Cl. X.R.

34—72